(12) United States Patent
Kerstan et al.

(10) Patent No.: US 11,192,438 B2
(45) Date of Patent: Dec. 7, 2021

(54) MOTOR VEHICLE HAVING A DRIVE BATTERY

(71) Applicant: Bayerische Motoren Werke Aktiengesellschaft, Munich (DE)

(72) Inventors: Herwig Kerstan, Maisach-Gernlinden (DE); Marcus Raepple, Walpertskirchen (DE); Gagan Saket, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 19 days.

(21) Appl. No.: 16/954,069

(22) PCT Filed: Dec. 19, 2018

(86) PCT No.: PCT/EP2018/085818
§ 371 (c)(1),
(2) Date: Jun. 15, 2020

(87) PCT Pub. No.: WO2019/121897
PCT Pub. Date: Jun. 27, 2019

(65) Prior Publication Data
US 2021/0162849 A1 Jun. 3, 2021

(30) Foreign Application Priority Data
Dec. 20, 2017 (DE) .................... 10 2017 223 407.5

(51) Int. Cl.
*B60K 1/04* (2019.01)
*H01M 50/24* (2021.01)
(Continued)

(52) U.S. Cl.
CPC ............. *B60K 1/04* (2013.01); *B62D 21/15* (2013.01); *B62D 25/20* (2013.01); *H01M 50/24* (2021.01);
(Continued)

(58) Field of Classification Search
CPC ....... B62D 25/20; B62D 21/15; H01M 50/24; B60K 1/04
See application file for complete search history.

(56) References Cited

U.S. PATENT DOCUMENTS

| 2013/0118824 A1* | 5/2013 | Maeda ...................... B60K 1/04 180/68.5 |
| 2016/0006006 A1* | 1/2016 | Motokawa .......... H01M 50/308 429/54 |

(Continued)

FOREIGN PATENT DOCUMENTS

| DE | 10 2011 120 960 A1 | 4/2013 |
| DE | 10 2013 204 765 A1 | 9/2014 |

(Continued)

OTHER PUBLICATIONS

International Search Report (PCT/ISA/210) issued in PCT Application No. PCT/EP2018/085818 dated Apr. 24, 2019 with English translation (five (5) pages).

(Continued)

*Primary Examiner* — James A Shriver, II
*Assistant Examiner* — James J Triggs
(74) *Attorney, Agent, or Firm* — Crowell & Moring LLP

(57) ABSTRACT

A motor vehicle has a drive battery which is accommodated in a drive battery housing. The drive battery housing is arranged and fastened on a floor structure, in particular on an underside, of a body of the motor vehicle. The drive battery housing has a lateral, in particular a left-hand and a right-hand, outer housing carrier structure which is arranged below, in particular left-hand and right-hand, side sills of the body in such a way that a first collision load path in a vehicle transverse direction, which is formed (substantially only) by the side sills and the floor structure of the body, and a second collision load path in a vehicle transverse direction, which is (Continued)

formed (substantially only) by the drive battery housing, are (substantially) completely separate from one another.

14 Claims, 2 Drawing Sheets

(51) Int. Cl.
  *B62D 21/15* (2006.01)
  *B62D 25/20* (2006.01)
(52) U.S. Cl.
  CPC ... *B60K 2001/0438* (2013.01); *B60Y 2306/01* (2013.01); *H01M 2220/20* (2013.01)

(56) References Cited

U.S. PATENT DOCUMENTS

| | | |
|---|---|---|
| 2016/0006008 A1 | 1/2016 | Volz |
| 2017/0267121 A1* | 9/2017 | Kotik ............... B60L 50/64 |
| 2017/0305251 A1* | 10/2017 | Hara ............... H01M 50/20 |

FOREIGN PATENT DOCUMENTS

| | | |
|---|---|---|
| DE | 10 2014 224 545 A1 | 6/2016 |
| DE | 11 2015 003 046 T5 | 3/2017 |
| DE | 10 2016 004 577 A1 | 10/2017 |
| JP | 7-81623 A | 3/1995 |

OTHER PUBLICATIONS

German-language Written Opinion (PCT/ISA/237) issued in PCT Application No. PCT/EP2018/085818 dated Apr. 24, 2019 (seven (7) pages).

German-language Search Report issued in German Application No. 10 2017 223 407.5 dated Nov. 9, 2018 with partial English translation (12 pages).

* cited by examiner

MOTOR VEHICLE HAVING A DRIVE BATTERY

BACKGROUND AND SUMMARY OF THE INVENTION

The present invention relates to a motor vehicle with a drive battery.

Motor vehicles which can be driven electrically, for example motor vehicles with a pure electric drive or what are known as hybrid vehicles which have both an electric drive and an internal combustion engine drive, are already known. In the drive train, said motor vehicles usually have an electric motor for driving the motor vehicle and a traction battery which can also be called a drive battery, which traction battery provides electric energy for the electric motor. A traction battery of this type is frequently also called a high voltage energy store. It is known that battery cells can be combined to form battery modules in the traction battery. The battery cells or battery modules are accommodated in a housing of the traction battery which serves to protect the battery cells and contains further apparatuses, for example for the control and climate control of the battery cells. A traction battery of this type can be arranged, for example, in the region of a floor of the motor vehicle between the front axle and the rear axle of the motor vehicle.

For example, DE 102013204765 A1 discloses a storage cell structural unit, that is to say a traction battery, for storing electric energy for the drive of an electric motor of a motor vehicle. A housing of the traction battery is attached on an underside of the motor vehicle and additionally has an energy absorption region which is configured on outer edge regions of the housing and, in the case of a collision, contributes to a dissipation of collision energy, without the storage cells themselves which are accommodated in the housing being damaged. The housing is arranged between the side sills of the motor vehicle and is connected to them. In the case of a lateral collision of the motor vehicle, a load is introduced in the case of this arrangement into the side sill which is in turn supported on the housing of the traction battery and a floor, and possibly a floor crossmember (not shown).

It is the object of the present invention to provide a motor vehicle with a drive battery, an installation space for the drive battery being utilized in an improved manner, and it being possible for the drive battery to contribute in an improved manner to the absorption of collision energy in the case of a lateral collision of the motor vehicle, that is to say a collision in the vehicle transverse direction.

This object is achieved by way of a motor vehicle with a drive battery, which motor vehicle has the features of the independent claim. Advantageous developments are indicated in the dependent patent claims.

According to the invention, a motor vehicle has a drive battery which is accommodated in a drive battery housing. The drive battery housing is arranged on and fastened to a floor structure, in particular on an underside, of a vehicle body of the motor vehicle. The drive battery housing has a lateral (in particular, a left hand and a right hand) outer housing carrier structure which is arranged below (in particular, left hand and right hand) side sills of the vehicle body in such a way that a first collision load path in the vehicle transverse direction, which first collision load path is configured (substantially only) by way of the side sills and the floor structure of the vehicle body, and a second collision load path is the vehicle transverse direction, which second collision load path is configured (substantially only) by way of the drive battery housing, are (substantially) completely separate from one another.

Separate collision load paths in the vehicle transverse direction mean, in particular, that the outer housing carrier structure of the drive battery housing and the side sill do not overlap or do not merge into one another in the vehicle transverse direction. The vehicle body of the motor vehicle and the drive battery housing can therefore be designed separately from one another with regard to the collision load paths. The load paths which are substantially independent of one another contribute jointly, however, to the dissipation of collision energy in the case of a lateral collision of the motor vehicle. Furthermore, the collision load paths which are separate from one another lead to a structural design of the drive battery housing and the floor structure of the vehicle body, which structural design simplifies a mounting of the drive battery housing on the floor structure of the vehicle body.

The side sills of the vehicle body are lateral lower, outer longitudinal carriers of the vehicle body and are arranged both on the left and on the right in the vehicle body.

The vehicle transverse direction corresponds to the y-direction in the usually customary vehicle coordinate system.

The motor vehicle is, in particular, a passenger motor vehicle or a heavy goods vehicle. The motor vehicle can be a purely electrically driven motor vehicle or what is known as a hybrid motor vehicle which has at least one electric drive and a further drive with, for example, an internal combustion engine.

The drive battery housing according to the invention is configured for receiving and transmitting of absorption of collision loads. Here, the housing carrier structure is that constituent part of the drive battery housing which can absorb loads on a relatively large scale, contributes to the rigidity of the housing, and is configured for the absorption of collision energy by way of deformation. In addition to the lateral outer housing carrier structure, the housing carrier structure can have a crossmember structure which runs between the left hand and right hand lateral outer housing carrier structure.

The floor structure of the vehicle body can be configured by way of floor panels and crossmembers, for example seat crossmembers, to which seats are usually fastened.

In accordance with one preferred development of the invention, the side sills of the vehicle body and the lateral outer housing carrier structure of the drive battery housing do not overlap one another in the vehicle transverse direction. In other words, there is no overlap between the side sill and the associated lateral outer housing carrier structure of the drive battery housing in the vehicle transverse direction. Accordingly, the side sills and the associated lateral, outer housing carrier structure do not engage behind one another in the vehicle transverse direction. There is no mutual congruence or overlap as viewed in the vehicle transverse direction.

As a result, the vehicle body and the housing carrier structure of the drive battery can be designed independently of one another. In the case of a lateral collision of the motor vehicle, the side sills as a constituent part of the vehicle body and the lateral outer housing carrier structure of the drive battery are substantially not supported on one another in the vehicle transverse direction, since there is no lateral overlap. Accordingly, the first collision load path and the second collision load path are completely separate from one another. The motor vehicle is constructed in such a way that, in the case of the lateral collision, the side sill is not supported on the associated lateral outer housing carrier structure of the drive battery housing or on other constituent parts of the drive housing.

The first collision load path and the second collision load path are preferably configured in such a way that the two collision load paths act from the beginning of the collision in the case of a lateral collision of the motor vehicle.

In this way, the two collision load paths already contribute at the beginning of the lateral collision of the motor vehicle at the same time to a dissipation of collision energy at as high a load level as possible.

In the vehicle vertical direction, that is to say a z-direction in the vehicle coordinate system, a complete overlap of the lateral outer housing carrier structure of the drive battery housing and the associated side sill can be configured. Here, a lateral (left hand and right hand) outer side of the drive battery housing, that is to say a left hand outer side of the left hand outer housing carrier structure and a right hand outer side of the right hand outer housing carrier structure, and a (left hand and right hand) outer side of the associated side sill of the vehicle body lie substantially above one another in the vehicle vertical direction. Therefore, a width of the drive battery housing corresponds substantially to a width of the vehicle body which is adjacent with respect to the drive battery housing.

As a result, in the case of a collision, both the first collision load path and the second collision load path contribute substantially at the same time and from the beginning of the lateral collision of the motor vehicle to a dissipation, that is to say an absorption, of collision energy.

In accordance with a further preferred embodiment, a height of the lateral outer housing carrier structure of the drive battery housing corresponds substantially to a height of the drive battery housing over its entire width in the vehicle transverse direction.

The height of the drive housing is defined by way of the spacing from an underside, that is to say a floor or a lower wall, to an upper side, that is to say a cover or an upper wall.

In accordance with one preferred development of the present invention, the drive battery housing has crossmembers which connect a left hand lateral outer housing carrier structure and a right hand lateral outer housing carrier structure to one another, and is designed for receiving, transmitting and/or absorbing collision loads in the vehicle transverse direction.

Therefore, the lateral outer housing carrier structures of the drive battery housing might be supported on one another in the case of a lateral collision of the motor vehicle.

The drive battery housing is preferably arranged on the floor structure of the vehicle body between a front axle and a rear axle.

In accordance with a further preferred embodiment, the drive battery housing configures a hermetically closed, media-tight unit.

Therefore, the drive battery is accommodated in the drive battery housing in a manner which is protected against external environmental influences independently of the vehicle body of the motor vehicle.

The lateral outer housing carrier structure can be configured from an extruded profile, in particular made from a light metal or a light metal alloy, for example made from aluminum or an aluminum alloy.

As a result, the drive battery housing can have a low weight and can be produced easily.

The lateral outer housing carrier structure can be configured in a shell design, in particular made from steel.

As a result, the drive battery housing can be produced inexpensively.

In accordance with one preferred development of the present invention, in the case of the motor vehicle, the side sill and the housing carrier structure which is arranged adjacently can be trimmed on an outer side of the motor vehicle by way of a panel which forms, in particular, a section of a vehicle body outer skin.

As a result, the drive battery housing is not visible, and the outer side of the motor vehicle can be of correspondingly elegant configuration. The panel has no substantial relevance for receiving, transmission and absorption of collision loads in the case of a lateral collision of the motor vehicle.

In accordance with one preferred development, the drive battery housing can be fastened to the vehicle body by way of a bolt connection, for example a screw connection.

As a result, the drive battery housing together with the drive battery can be exchanged easily and is accessible in an improved manner for maintenance work. Furthermore, the floor structure of the motor vehicle body is therefore also accessible from below by way of removal of the drive battery.

In the case of the motor vehicle according to the invention, the lateral outer housing carrier structure of the drive battery housing preferably overlaps the side sills substantially completely in the vehicle vertical direction.

The drive battery housing preferably extends substantially over an entire width of the motor vehicle or the floor structure of the motor vehicle. Accordingly, the drive battery housing has substantially the same width as the motor vehicle or the floor structure of the motor vehicle including the side sills. Accordingly, the outer sides of the lateral, outer housing carrier structure adjoin the outer side of the motor vehicle or are a constituent part of the outer side of the motor vehicle, it also perhaps being possible for a trim panel to be attached as a vehicle body outer skin which is not a constituent part of the drive battery housing.

In accordance with a further preferred embodiment, at least the lateral, outer housing carrier structure or the entire drive battery housing is arranged completely below the side sills, without at least the lateral, outer housing carrier structure or the entire drive battery housing overlapping or being congruent with the side sills in the vehicle transverse direction. Therefore, the lateral, outer housing carrier structure does not engage behind the side sill.

The abovementioned supplementary features of the invention can be combined with one another in any desired manner in so far as this is possible and appropriate.

A detailed description of the invention follows with reference to the figures.

DETAILED DESCRIPTION OF THE DRAWINGS

Figure 1:
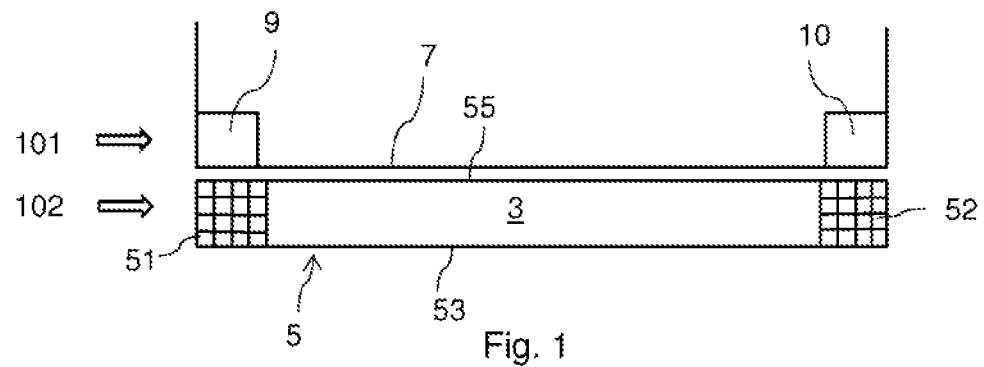
FIG. 1 is a diagrammatic sectional view through a motor vehicle body with a drive battery in accordance with one exemplary embodiment of the present invention.
Figure 2:
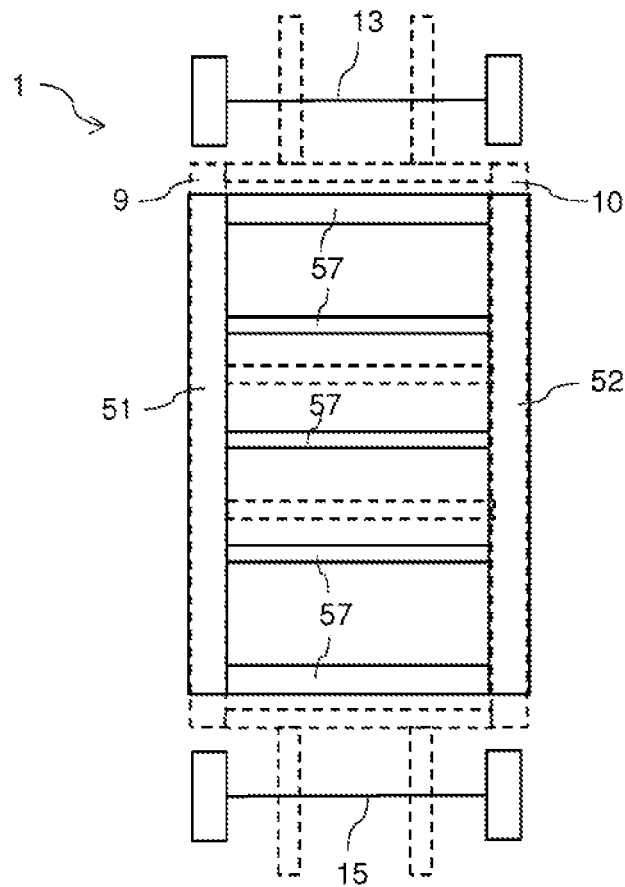
FIG. 2 is a diagrammatic plan view of the motor vehicle body with the drive battery in accordance with the exemplary embodiment of the present invention.

As is shown diagrammatically in FIGS. 1 and 2, a vehicle body of a motor vehicle 1 has a floor structure 7 with a floor panel and a left hand side sill 9 and a right hand side sill 10. Here, the floor structure 7 of the vehicle body of the motor vehicle 1 is preferably configured from steel, aluminum or in a fiber composite design. The floor structure 7 extends in a region between a front axle 13 and a rear axle 15 of the motor vehicle 1, and configures the lower region of a passenger compartment of the motor vehicle 1. A drive battery 3 is accommodated and arranged in a drive battery housing 5 on the underside of the floor structure 7 of the vehicle body. The drive battery 3 in the drive battery housing 5 extends substantially over an entire region or at least over a great region between the front axle 13 and the rear axle 15, as can be seen in the plan view of FIG. 2. The drive battery housing 5 has a left hand outer housing carrier structure 51 and a right hand outer housing carrier structure 52, and a lower wall 53 and an upper wall 55. In addition to the left hand outer housing carrier structure 51 and the right hand outer housing carrier structure 52, the housing carrier structure has further carriers, such as a plurality of crossmembers 57 which run between the left hand outer housing carrier structure 51 and the right hand outer housing carrier structure 52. The drive battery housing 5 has substantially the same width as the adjoining vehicle body. The left hand outer housing carrier structure 51 is situated below the left hand side sill 9, and the right hand outer housing carrier structure 52 is situated below the right hand side sill 10. An upper side of the drive battery housing 5 is of substantially planar configuration, as a result of which simple mounting of the drive battery housing 5 on the vehicle body is possible. The plan view of FIG. 2 shows the vehicle body with the side sills 9 and 10 using dashed lines, whereas the housing carrier structure 51, 52, 57 of the drive battery housing 5 is shown using solid lines. The illustration of FIG. 1 shows both the vehicle body constituent parts of the motor vehicle and the drive battery housing 5 using solid lines.

The drive battery 3 itself consists, for example, of a multiplicity of battery cells which are combined in a plurality of battery modules, and further devices for the control and temperature control of the drive battery 3. The drive battery housing 5 is fastened releasably to the vehicle body by means of screw connections. The drive battery housing 5 and, in particular, the housing carrier structure 51, 52, 57 can be configured from aluminum. The left hand outer housing carrier structure 51 and the right hand outer housing carrier structure 52 are configured, for example, as extruded profiles with a plurality of chambers.

The left hand outer housing carrier structure 51 and the right hand outer housing carrier structure 52 are configured in such a way that they do not overlap with the associated side sills 9 and 10 in a vehicle transverse direction, that is to say in a y-direction. The drive battery housing 5 has a width which corresponds to the width of the vehicle body of the motor vehicle which is arranged above it. Therefore, the left hand and right hand outer housing carrier structure 51, 52 covers the associated side sill 9 and 10 in a vertical direction, that is to say a z-direction of the motor vehicle. A panel (not shown) which covers the drive battery housing 5 and the associated side sill 9 and 10 is arranged on a vehicle body outer side, with the result that the drive battery housing 5 is not visible from the side.

The motor vehicle 1 therefore has two load paths 101, 102 in its lower region for a lateral collision between the front axle and the rear axle. The first lower load path 101 in the vehicle transverse direction is configured by way of the side sills 9, 10. In particular, the side sills 9, 10 together with the floor structure 7, that is to say floor panel and crossmembers, configure the first lower load path 101. The second lower load path 102 in the vehicle transverse direction is configured by way of the lateral lower housing carrier structures 51, 52 of the drive battery housing 5. In particular, the lateral lower housing carrier structures 51, 52 together with the crossmembers 57 and possibly assisted by way of the lower wall 53 and the upper wall 55 configure the second load path 102. The first load path 101 is arranged above the second load path 102. In the case of the collision load in the vehicle transverse direction, the load paths 101, 102 are configured independently from one another and/or completely separately from one another.

In the case of a lateral collision of the motor vehicle, the two load paths 101, 102 can absorb loads, forward them, and absorb them by way of suitable deformation of the participating carrier structure. In the case of the lateral collision of the motor vehicle, the two load paths 101, 102 become active at the same time and therefore already make a high load level for the dissipation of collision energy possible at the beginning of the collision.

Figure 3:
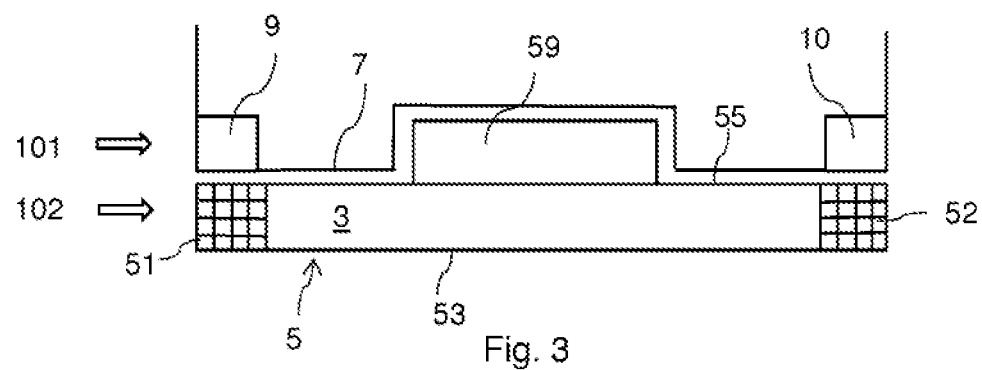
FIG. 3 is a diagrammatic sectional view through the motor vehicle body with the drive battery in accordance with one modification of the exemplary embodiment of the present invention.

The drive battery 3 in accordance with the exemplary embodiment which is shown in FIG. 1 is of "single story" configuration. This means that the battery cells which all have the same height are arranged next to one another in the drive battery housing. In one modification of said exemplary embodiment, however, it is also possible for the drive battery 3 to be of "double story" configuration in sections, as shown in the sectional view in FIG. 3, in order to increase the drive battery capacity. Accordingly, the drive battery housing 5 is adapted and is likewise configured in sections with a second level 59 for receiving the second level of battery cells. For this purpose, the drive battery housing 5 protrudes in sections into the floor structure 7 of the motor vehicle 1. This does not mean, however, that the load paths 101 and 102 overlap in the vehicle transverse direction, since the second level 59 of the drive battery housing 5 is firstly spaced apart from the side sills 9 and 10, and the second level 59 of the drive battery housing 5 itself is not configured as a load path for receiving, transmission and absorption of collision loads in the vehicle transverse direction.

What is claimed is:

1. A motor vehicle with a drive battery, comprising:
   a drive battery housing which accommodates the drive battery, the drive battery housing being arranged on and fastened to a floor structure of a vehicle body of the motor vehicle, wherein
   the drive battery housing comprises a lateral, outer housing carrier structure which is arranged below side sills of the vehicle body such that a first collision load path in a vehicle transverse direction, which first collision load path is configured by way of the side sills and the floor structure of the vehicle body, and a second collision load path in the vehicle transverse direction, which second collision load path is configured substantially only by way of the drive battery housing, are substantially separate from one another.

2. The motor vehicle according to claim 1, wherein
   the side sills of the vehicle body and the housing carrier structure of the drive battery housing do not overlap one another in the vehicle transverse direction, and/or
   the first collision load path and the second collision load path are configured such that the first and second collision load paths act from a beginning of a collision in the case of a lateral collision of the motor vehicle.

3. The motor vehicle according to claim 2, wherein
a height of the housing carrier structure of the drive battery housing corresponds over its entire width in the vehicle transverse direction to the height of the drive battery housing, and/or
an upper side of the drive battery housing is of substantially planar configuration.

4. The motor vehicle according to claim 1, wherein
the drive battery housing has crossmembers which connect a left hand housing carrier structure and a right hand housing carrier structure to one another, and is designed for absorbing collision loads in the vehicle transverse direction.

5. The motor vehicle according to claim 1, wherein
the drive battery housing is arranged on the floor structure of the vehicle body between a front axle and a rear axle.

6. The motor vehicle according to claim 1, wherein
the drive battery housing is configured as a hermetically closed, media-tight unit.

7. The motor vehicle according to claim 1, wherein
the housing carrier structure is configured from an extruded profile or a plurality of extruded profiles, and is made from a light metal or a light metal alloy.

8. The motor vehicle according to claim 1, wherein
the housing carrier structure is configured in a shell design.

9. The motor vehicle according to claim 1, wherein
the side sill and the housing carrier structure which is arranged adjacently are trimmed on an outer side of the motor vehicle by way of a panel which forms a section of a vehicle body outer skin.

10. The motor vehicle according to claim 1, wherein
the drive battery housing is fastened releasably to the vehicle body by way of a bolt connection.

11. The motor vehicle according to claim 1, wherein
the lateral outer housing carrier structure of the drive battery housing overlaps the side sills substantially completely in the vehicle vertical direction.

12. The motor vehicle according to claim 7, wherein
the light metal or the light metal alloy is aluminum or an aluminum alloy.

13. The motor vehicle according to claim 8, wherein
the shell design is made of steel.

14. The motor vehicle according to claim 1, wherein the motor vehicle is a passenger motor vehicle.

* * * * *